(12) United States Patent
Silva et al.

(10) Patent No.: US 12,303,351 B2
(45) Date of Patent: May 20, 2025

(54) DENTAL PROSTHESIS

(71) Applicants: JUVORA LIMITED, Lancashire (GB); MALÓ CLINIC, S.A., Lisbon (PT)

(72) Inventors: António Silva, Lisbon (PT); João Legatheaux, Lisbon (PT); Miguel De Araújo Nobre, Lisbon (PT); Carlos Moura Guedes, Lisbon (PT); Ricardo Almeida, Lisbon (PT); Nuno Sereno, Lancashire (GB)

(73) Assignee: MALÓ CLINIC, Lisbon (PT)

( * ) Notice: Subject to any disclaimer, the term of this patent is extended or adjusted under 35 U.S.C. 154(b) by 433 days.

(21) Appl. No.: 16/628,876

(22) PCT Filed: Jul. 5, 2018

(86) PCT No.: PCT/GB2018/051899
§ 371 (c)(1),
(2) Date: Jan. 6, 2020

(87) PCT Pub. No.: WO2019/008368
PCT Pub. Date: Jan. 10, 2019

(65) Prior Publication Data
US 2020/0222153 A1    Jul. 16, 2020

(30) Foreign Application Priority Data
Jul. 7, 2017  (GB) .................................... 1711004

(51) Int. Cl.
A61C 8/00    (2006.01)
(52) U.S. Cl.
CPC .......... *A61C 8/0016* (2013.01); *A61C 8/0063* (2013.01)

(58) Field of Classification Search
CPC ... A61C 8/0016; A61C 8/0063; A61C 8/0048; A61C 13/00–34
(Continued)

(56) References Cited

U.S. PATENT DOCUMENTS 4,850,870 A * 7/1989 Lazzara ................. A61C 8/005
                                                              433/201.1
5,006,069 A * 4/1991 Lazzara ................. A61C 8/008
                                                                433/173
(Continued)

FOREIGN PATENT DOCUMENTS

CH     690 986      3/2001
EP     2351536      8/2011
(Continued)

OTHER PUBLICATIONS

International Search Report, International Patent Application No. PCT/GB2018/051899, mailed Dec. 18, 2018, 8 pages.
(Continued)

*Primary Examiner* — Matthew M Nelson
(74) *Attorney, Agent, or Firm* — Rivka Friedman (57) ABSTRACT

A dental prosthesis formed of a composition comprising a polymeric material, the prosthesis comprising one or more locating formations adapted to receive a dental implant fixture or dental abutment, the or each locating formation comprising a recess comprising a first recess portion formed in the polymeric material of the prosthesis, and a second recess portion provided in a sleeve located in the prosthesis.

18 Claims, 8 Drawing Sheets

(58) Field of Classification Search
USPC .......................................................... 433/174
See application file for complete search history.

(56) References Cited

U.S. PATENT DOCUMENTS

| | | | | |
|---|---|---|---|---|
| 5,040,982 | A * | 8/1991 | Stefan-Dogar | A61C 8/005 433/169 |
| 5,873,721 | A * | 2/1999 | Willoughby | A61C 8/0048 433/172 |
| 2010/0145393 | A1 * | 6/2010 | Fallin | A61B 17/866 606/301 |
| 2011/0269105 | A1 * | 11/2011 | Jahn | A61C 8/0056 433/175 |
| 2012/0202173 | A1 * | 8/2012 | Seo | A61C 5/70 433/220 |
| 2018/0153663 | A1 * | 6/2018 | Sereno | A61C 13/0024 |
| 2020/0281703 | A1 * | 9/2020 | Glueck | A61C 8/0013 |

FOREIGN PATENT DOCUMENTS

| | | |
|---|---|---|
| EP | 2904987 | 8/2015 |
| FR | 1 319 420 | 3/1963 |
| WO | 2011/069226 | 6/2011 |
| WO | 2013/142350 | 9/2013 |

OTHER PUBLICATIONS

International Preliminary Report on Patentability, International Patent Application No. PCT/GB2018/051899, mailed Jan. 7, 2020, 16 pages.
Search Report, GB Patent Application No. 1711004.0, mailed Jan. 19, 2018, 5 pages.

* cited by examiner

DENTAL PROSTHESIS

The present invention relates to an improved polymeric dental prosthesis for mounting to dental implant fixtures affixed to a patient's jaw.

It has been found that PAEK polymer, also including PEEK (polyetheretherketone) polymer is useful in the manufacture of dental prostheses, which are typically manufactured by shaping a block of the polymer material, commonly referred to as a dental disc, by means of computer-aided milling. The resulting dental prostheses are affixed to a patients jaw via fixtures implanted into the jaw in order to restore dental appearance and function.

SUMMARY OF THE INVENTION

The present invention provides a dental prosthesis formed of a composition comprising a polymeric material, the prosthesis comprising one or more locating formations adapted to receive a dental implant fixture or dental abutment, the or each locating formation comprising a recess comprising a first recess portion formed in the polymeric material of the prosthesis, and a second recess portion provided in a sleeve locatable in the prosthesis.

Optionally, the first recess portion and the second recess portion are contiguous.

Optionally, the recess is an inverted frustum-shaped recess.

Optionally, the recess has an inverted conical frustum shape.

Optionally, the recess is a cubic shaped recess.

Optionally, the recess is a dome-shaped recess.

Optionally, the recess is a spherical dome-shaped recess.

Optionally, the recess is a cylindrical recess.

Optionally, the first recess portion is substantially cylindrical.

Optionally, the recess comprises base and a top, wherein the base is narrower than the top such that a sidewall of said recess tapers towards the base.

Optionally, the first recess portion has an upper end and a lower end with a sidewall extending thereinbetween, the lower end having a diameter D1.

Optionally, wherein the recess is frustum-shaped or conical frustum shaped, the sidewall of the he first recess portion is a tapered sidewall having a taper angle φ.

Optionally, the sidewall of the first recess portion is a curved sidewall.

Optionally, wherein the recess is spherical dome-shaped recess, the first and second recess portions each have the shape of a spherical segment.

Optionally, wherein the recess is spherical dome-shaped recess, the first recess portion has the shape of a spherical segment, and second recess portion has the shape of a spherical cap.

Optionally, the first recess portion and the second recess portion of a spherical dome-shaped recess have a substantially the same spherical radius R.

Optionally, the prosthesis comprises a bore formed below and opposing the first recess portion, the bore having a having a diameter greater than D1 such that an annular undercut region is formed immediately below the lower end of the first recess portion. Thus the bore is in communication with the first recess portion.

Optionally, the first recess portion and/or the bore formed below and opposing the first recess portion is/are formed in the prosthesis by milling.

Optionally, the sleeve comprises a generally tubular wall and an annular shoulder portion having an inner and an outer perimeter, wherein the inner perimeter of the annular shoulder portion defines the perimeter of the second recess portion.

Optionally, wherein the recess is frustum-shaped or conical frustum shaped, the second recess portion comprises a tapered annular sidewall surrounding a hub which separates said second recess portion from the interior of the sleeve.

Optionally, wherein the recess is a dome-shaped or spherical dome-shaped recess, the second recess portion comprises a curved sidewall surrounding a hub which separates said second recess portion from the interior of the sleeve.

Optionally, wherein the first recess portion is substantially cylindrical shaped recess, the second recess portion is tapered, the taper being defined by a chamfered circumference of an aperture provided though a hub of the sleeve which separates said second recess portion from the interior of the sleeve.

Optionally, the shoulder portion and the hub of the sleeve lie on substantially parallel spaced apart planes which are substantially orthogonal to the wall of said sleeve.

Conveniently, the sleeve is slidably locatable into the bore formed in the prosthesis below and opposing the first recess portion such that the wall of said sleeve is in abutment with the surface of said bore and the annular shoulder portion of said sleeve abuts the annular undercut region immediately below the lower end of the first recess portion.

Conveniently, the hub of the sleeve comprises an aperture provided though said hub to permit the shank of a screw inserted via the interior of the sleeve to extend through said sleeve and into the recess of the locating formation to screw threadedly engage with the dental abutment or implant fixture.

Optionally, the diameter D2 of the perimeter of the second recess is substantially equal to the diameter of D1 of the lower end of the first recess portion.

Optionally, the tapered sidewall of the second recess portion has a taper angle φ that is substantially the same as the taper angle φ of the tapered sidewall of the first recessed portion.

Optionally, the curved sidewall of the first recess portion and the second recess portion of a spherical dome-shaped recess have a substantially the same spherical radius R.

Advantageously, when the first recess portion and the second recess portion are brought into mutual communication, their respective tapered or curved sidewalls and define a continuous tapered or curved sidewall.

Optionally, the sleeve is provided with means to prevent rotation of the sleeve relative the prosthesis.

Optionally, the means to prevent rotation of the sleeve relative the prosthesis comprises a key formation on the outer surface of the sleeve wall which is adapted to engage with a complementary key formation provided on or in the bore formed in the prosthesis below and opposing the first recess portion.

Optionally, the respective key formations comprise one or more complementary flat portions provided on the respective opposing surfaces of the sleeve and bore.

Optionally, the sleeve is manufactured from titanium or an alloy thereof.

Optionally, the sleeve may be manufactured from cobalt chromium (Co—Cr) or an alloy thereof.

Optionally, the sleeve may be manufactured from stainless steel or an alloy thereof.

Optionally the depth of the recess is 2.3 mm.

Optionally the depth of the first recess portion (i.e. formed in the prosthesis) is 1.7 mm.

Optionally the diameter D1 of the lower end of first recess portion is 2.6 mm.

Optionally, the depth of the second recess portion (i.e. formed in the sleeve) is 0.6 mm.

Optionally, the diameter D2 of the perimeter of the second recess portion at its junction with the annular shoulder portion is 2.6 mm.

Optionally, the width of shoulder portion of the sleeve is 0.8 mm.

Optionally, the diameter of the sleeve is 4.2 mm.

Optionally, the minimum thickness of the prosthesis surrounding the sleeve at its closest point to the sleeve wall (i.e. adjacent the outer perimeter of annular shoulder) is 0.5 mm.

Preferably, the thickness of the prosthesis surrounding the sleeve at it its closest point to the outer diameter of the sleeve wall (i.e. adjacent the outer perimeter of annular shoulder) is at least 0.7 mm.

Advantageously, the sleeve provides reinforcement to the recess and reinforces the connection between the prosthesis and the dental abutment or implant feature.

Advantageously, embodiments of the invention allow for adaptation for connection directly to an implant head of Nobel Biocare® and Straumann) dental implant systems.

By reinforcing the connection between the dental implant fixture and the prosthesis by the use of a reinforcing sleeve, a wider range of torque forces can be applied to the screw used to secure the prosthesis to the implant feature.

This is because the sleeve provides an interface between the screw and the polymeric prosthesis such that the screw does not directly impinge or contact the polymeric prosthesis, but rather the screw head engages the reverse side of the hub of the sleeve in use.

Thus higher torque forces can be applied than otherwise would be possible without the presence of such a sleeve. Accordingly, the sleeve provides increased stability and wider user flexibility when torqueing the prosthesis to a dental implant feature.

Further advantageously, the sleeve allows for a more precise fit between the polymeric prosthesis and the implant interface improving the passivity of the system. One of the challenges relating to the clinical use of full arch implant restorations is achieving a passive fit between the dental implants and the dental prostheses. Passive fit is an important factor is assuring long-term osseointegration and dental implant survival. If passive fit in the system is not obtained, this may lead to biological and mechanical complications. The sleeve allows for a greater degree of assurance in passivity seating between the implant system and the polymer prosthesis, thereby improving the likelihood of success of achieving passive fit in patients being treated with full-arch implant supported prostheses.

Further advantageously, the sleeve permits the use of screws having small or conical heads to secure the prosthesis to an implant feature. Thus the invention permits the use of a wider range of dental implant systems, in particular dental implant features adapted to use abutment screws carrying conical and small screw heads.

Advantageously, the small size of the sleeve (approximately 4.2 mm diameter) mitigates its impact on the overall dimensions of a polymeric prosthesis adapted to receive the sleeve. Thus prostheses in accordance with the invention achieve maximum stability with minimal dimensional change required to the prostheses.

The polymeric material preferably comprises a repeat unit of formula (I):

wherein t1 and w1 independently represent 0 or 1 and v1 represents 0, 1 or 2.

The composition, may consist or consist essentially of the polymeric material, or may include, for instance from 60 to 100%, say from 75 to 100% of the polymeric material, with from 0 to 40%, say from 0 to 25% of other materials. The composition may include, for example colourants (e.g. pigments, ceramics, metal oxides (e.g. titanium dioxide)) or fillers (for example reinforcing or wear enhancing fillers or fibres, bioactive fillers such as bioglasses, soluble glasses, zeolites containing antibacterial agents such as silver ions, nanosilver, ceramics such as hydroxyapatite (HA) or substituted HA or treatment agents such as antibiotic doped HA or compounds favourable to the gingiva, diagnostic agents such as radiopaque fillers such as barium sulphate, aesthetic fillers such as reflective agents and light refracting agents, fillers conveying some taste or flavour altering or enhancing effect or breath freshening effect). The composition may include, for instance, 0-20 wt %, suitably 0-10 wt % of colourants. Colorants compounded with the polymer enable a range of dental relevant coloration, for example but not restrictive to white, tooth and dentin colour, bone colour, pink, gum and gingiva colour. Colourants may be selected so the composition is white. Colourants may be employed so that the colour is graduated. In one embodiment, the composition includes no colourant. When a filler is included in the composition, it may suitably be included to improve the mechanical properties and/or bonding characteristics and/or biological acceptability of the composition. However, it has been found that cores for tooth prostheses with excellent mechanical properties can be made without requiring addition of filler. Preferably, the composition comprises at least 80 wt %, at least 90 wt % or at least 94 wt % of the polymeric material. The polymeric material may be the same polymeric material for each of the first and second portions, or may be a different polymeric material. Preferably, the same polymeric material such as PEEK homopolymer is used as polymeric material in each of the first and second portions.

The polymeric material preferably consists essentially of a repeat unit of formula I. Preferred polymeric materials comprise (or consist essentially of) a repeat unit wherein t1=1, v1=0 and w1=0; t1=0, v1=0 and w1=0; t1=0, w1=1, v1=2; or t1=0, v1=1 and w1=0. More preferred polymeric materials comprise (or consist essentially of) a repeat unit wherein t1=1, v1=0 and w1=0; or t1=0, v1=0 and w1=0. The most preferred polymeric material comprises (or consists essentially of) a repeat unit wherein t1=1, v1=0 and w1=0: in other words a homopolymeric polyetheretherketone.

In preferred embodiments, the polymeric material is selected from polyetheretherketone, polyetherketone, polyetherketoneetherketoneketone and polyetherketoneketone. In a more preferred embodiment, the polymeric material is selected from polyetherketone and polyetheretherketone. In another preferred embodiment, the polymeric material is polyetheretherketone such as a homopolymer polyetheretherketone.

The polymeric material may have a Notched Izod Impact Strength (specimen 80 mm×10 mm×4 mm with a cut 0.25 mm notch (Type A), tested at 23° C., in accordance with IS0180) of at least 3 $KJm^{-2}$, preferably at least 4 $KJm^{-2}$, more preferably at least 4.5 $KJm^{-2}$. The Notched Izod Impact Strength may be less than 10 $KJm^{-2}$, suitably less than 8 $KJm^{-2}$. The Notched Izod Impact Strength may be at least 3 $KJm^{-2}$, suitably at least 3.5 $KJm^{-2}$, preferably at least 4 $KJm^{-2}$. The impact strength may be less than 50 $KJm^{-2}$, suitably less than 30 $KJm^{-2}$.

The polymeric material suitably has a melt viscosity (MV) of at least 0.06 $kNsm^{-2}$, preferably has a MV of at least 0.09 $kNsm^{-2}$, more preferably at least 0.12 $kNsm^{-2}$, or at least 0.15 $kNsm^{-2}$. Advantageously, the MV may be at least 0.30 $kNsm^{-2}$ and/or at least 0.35 $kNsm^{-2}$. An MV of 0.4 $kNsm^{-2}$ has been found to be particularly advantageous in the manufacture of accurate, strong dental prosthetics.

MV is suitably measured using capillary rheometry operating at 400° C. at a shear rate of 1000 $s^{-1}$ using a cylindrical tungsten carbide die, 0.5 mm×3.175 mm (diameter×length of die).

The polymeric material may have a MV of less than 1.00 $kNsm^{-2}$, preferably less than 0.5 $kNsm^{-2}$.

The polymeric material may have a MV in the range 0.09 to 0.5 $kNsm^{-2}$, preferably in the range 0.14 to 0.5 $kNsm^{-2}$, more preferably in the range 0.4 to 0.5 $kNsm^{-2}$.

The polymeric material may have a tensile strength, measured in accordance with IS0527 (specimen type 1b) tested at 23° C. at a rate of 50 mm/minute of at least 20 MPa, preferably at least 60 MPa, more preferably at least 80 MPa. The tensile strength is preferably in the range 80-110 MPa, more preferably in the range 80-100 MPa.

The polymeric material may have a flexural strength, measured in accordance with IS0178 (80 mm×10 mm×4 mm specimen, tested in three-point-bend at 23° C. at a rate of 2 mm/minute) of at least 50 MPa, preferably at least 100 MPa, more preferably at least 145 MPa. The flexural strength is preferably in the range 145-180 MPa, more preferably in the range 145-164 MPa.

The polymeric material may have a flexural modulus, measured in accordance with IS0178 (80 mm×10 mm×4 mm specimen, tested in three-point-bend at 23° C. at a rate of 2 mm/minute) of at least 1 GPa, suitably at least 2 GPa, preferably at least 3 GPa, more preferably at least 3.5 GPa. The flexural modulus is preferably in the range 3.5-4.5 GPa, more preferably in the range 3.5-4.1 GPa.

The polymeric material may be amorphous or semi-crystalline. It is preferably crystallisable. It is preferably semi-crystalline. The level and extent of crystallinity in a polymer is preferably measured by wide angle X-ray diffraction (also referred to as Wide Angle X-ray Scattering or WAXS), for example as described by Blundell and Osbom (Polymer 24, 953, 1983). Alternatively, crystallinity may be assessed by Differential Scanning Calorimetry (DSC).

The level of crystallinity of the polymeric material may be at least 1%, suitably at least 3%, preferably at least 5% and more preferably at least 10%. In or preferred embodiments, the crystallinity may be greater than 25%. It may be less than 50% or less than 40%.

The main peak of the melting endotherm (Tm) of the polymeric material (if crystalline) may be at least 300° C.

For the polymeric material, it is preferred that t1=1, v1=0 and w1=0.

A further aspect of the invention provides a reinforcing sleeve adapted for location in a dental prosthesis, the reinforcing sleeve comprising a generally tubular element comprising a tubular wall and an annular shoulder portion having an inner perimeter and an outer perimeter, wherein the inner perimeter of the annular shoulder portion defines the perimeter of a recess portion, wherein the recess portion comprises an annular sidewall surrounding a hub which separates said recess portion from the interior of said reinforcing sleeve, and wherein the recess is shaped to receive the terminal end of a dental implant fixture or dental abutment.

A further aspect of the invention provides a reinforcing sleeve adapted for location in a dental prosthesis and particularly suited for use Nobel Biocare® dental implant systems, the reinforcing sleeve comprising a generally tubular wall and having a hub one end and an open bore at an opposing end, the hub being provided with an aperture having a diameter that is less than the diameter of the opposing open bore.

Optionally, sleeves in accordance with the aspects of the invention are manufactured from titanium or an alloy thereof.

Optionally, the sleeves may be manufactured from cobalt chromium (Co—Cr) or an alloy thereof.

Optionally, the sleeves may be manufactured from stainless steel or an alloy thereof.

The various examples and aspects of the present invention can be practiced alone or in combination with one or more of the other examples or aspects, as will be appreciated by those skilled in the relevant arts. The various examples or aspects of the invention can optionally be provided in combination with one or more of the optional features of the other examples or aspects of the invention. Also, optional features described in relation to one example or aspect can optionally be combined alone or together with other features in different examples or aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. Any subject matter described in the specification can be combined with any other subject matter in the specification to form a novel combination. The invention is also capable of other and different examples and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including" or "is" preceding the recitation of the composition, element or group of elements and vice versa. In addition, the terms "consisting essentially of" and "consists essentially of" means including the components specified but excluding other components except for materials present as impurities, unavoidable materials present as a result of processes used to provide the components, and components added for a purpose other than achieving the technical effect of the invention.

In this disclosure, the words "typically" or "optionally" are to be understood as being intended to indicate optional or non-essential features of the invention which are present in certain examples but which can be omitted in others without departing from the scope of the invention.

All numerical values in this disclosure are understood as being modified by "about".

References herein such as "in the range x to y" are meant to include the interoperation "from x to y" and so include the values x and y.

All singular forms of elements, or any other components described herein are understood to include plural forms thereof and vice versa. References to directional and positional descriptions such as upper and lower and directions e.g. "up", "down" etc. are to be interpreted by a skilled reader in the context of the examples described and are not to be interpreted as limiting the invention to the literal interpretation of the term, but instead should be as understood by the skilled addressee.

It will be appreciated that the part of a dental implant fixture which engages with a locating formation in a prosthesis is commonly known as an abutment however it may also be referred to as a connector or cylinder, or generally as a dental implant fixture or feature.

DETAILED DESCRIPTION

Figure 1:
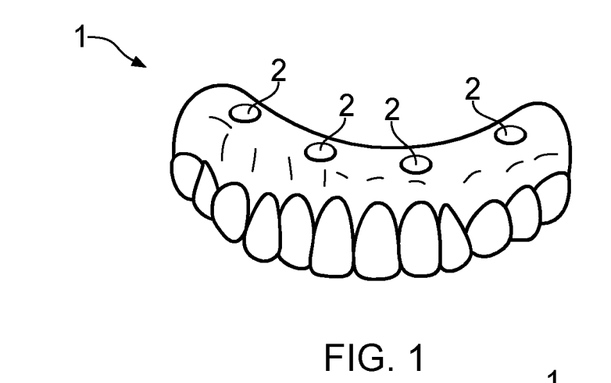
FIG. 1 is a schematic drawing showing an exemplary prior art dental prosthesis comprising a plurality of locating formations.

With reference to FIG. 1 there is shown an exemplary dental prosthesis 1 comprising a plurality of locating formations 2 adapted for mounting the prosthesis to a dental implant fixture or feature (not shown) affixed to a patient's jaw, or to an intermediate dental abutment that is attached to the free end of a dental implant fixture (not shown) affixed to a patient's jaw.

Figure 2:
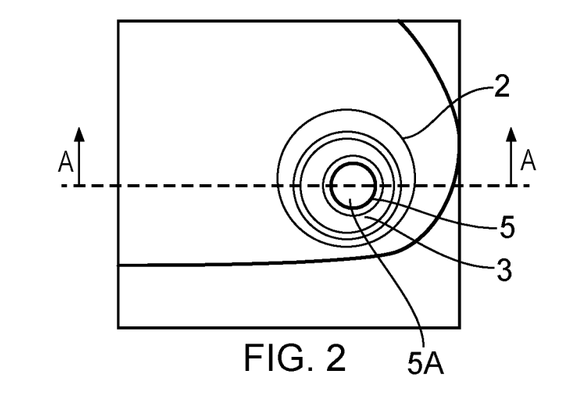
FIG. 2 is a detailed plan view of a locating formation of an exemplary prior art dental prosthesis.
Figure 3A:
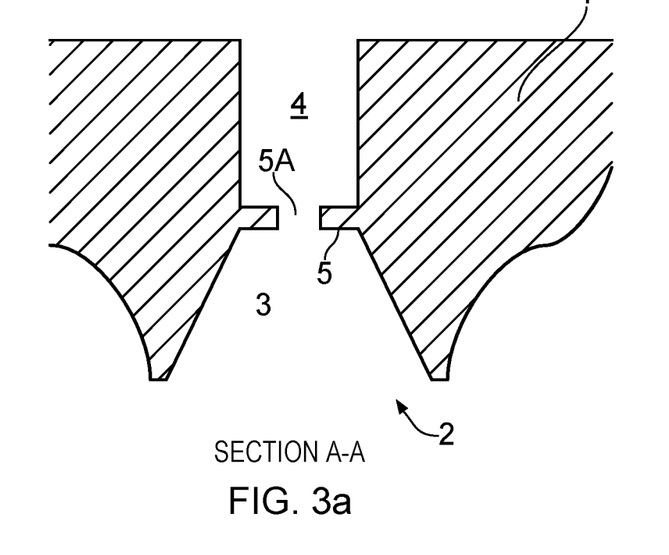
FIG. 3a is a schematic cross-section of the locating formation of FIG. 2.
Figure 3B:
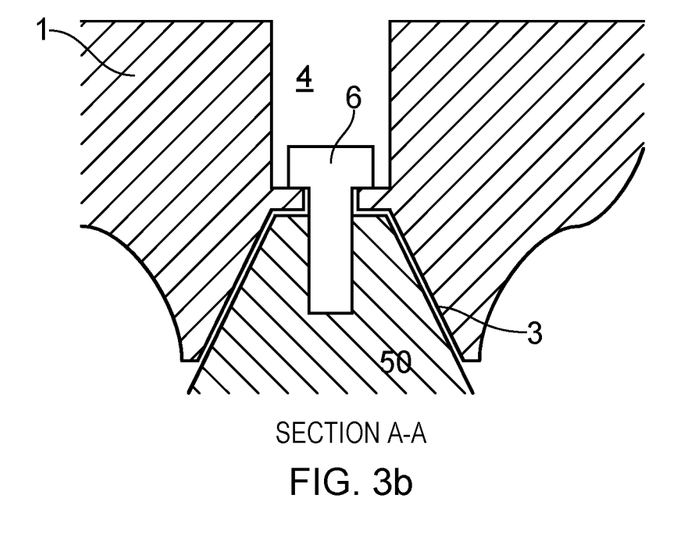
FIG. 3b is a schematic cross-section of the locating formation of FIG. 2 shown with a dental abutment in location.

With reference to FIGS. 2, 3a and 3b, a known type of locating formation 2 in a dental prosthesis 1 is formed having a tapered recess 3 that is separated from a substantially cylindrical bore 4 (FIGS. 3a and 3b) by a radially inwardly extending flange 5 (FIG. 3a). The tapered recess 3 is shaped to accommodate and engage a dental abutment or an abutment multi-unit or a dental implant feature 60 as shown schematically in FIG. 3b. An aperture 5A (FIG. 3a) defined by flange 5 permits the shank of a screw 6 (FIG. 3b) to extend through the locating formation 2 via bore 4 in order to screw threadedly engage with a dental abutment or dental implant feature 60 as shown in FIG. 3b. As screw 6 is tightened, the screw head engages the inwardly extending flange 5 thereby drawing the prosthesis 1 into tighter engagement with the dental abutment or dental implant feature 60 thereby affixing the prosthesis firmly to the patient's jaw. In FIG. 3b a gap is shown between the dental abutment or dental implant feature 60 and the tapered recess 3 of the locating formation 2 however it will be appreciated that the dental abutment and the tapered recess features contact in use.

Such dental prostheses are commonly machined from a block of material, for example a ceramic or polymeric block, by computed aided milling, with the specific geometry of the prostheses and their respective locating formations in dependence upon data collated using digital technology and in relation to the intended recipients of said prostheses.

Figure 10A:
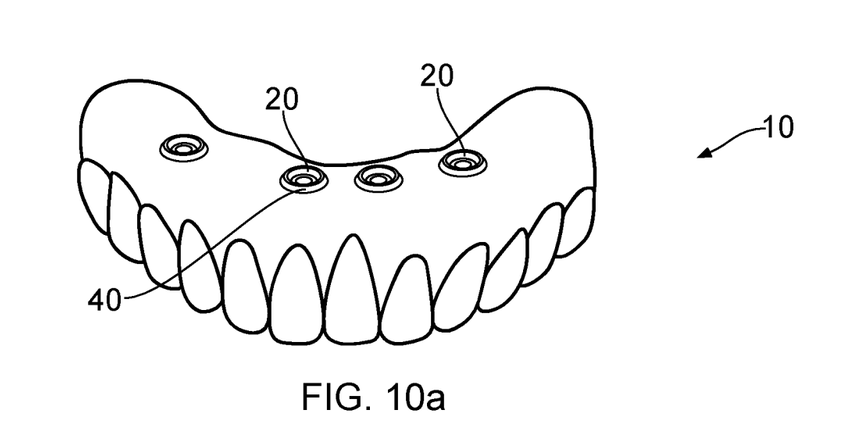
FIGS. 10a, 10b and 10c show exemplary dental prostheses comprising locating formations in accordance with the invention.
Figure 10B:
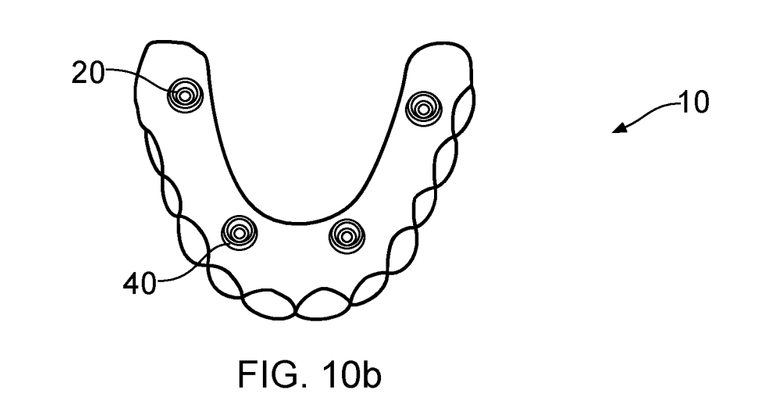
Figure 10C:
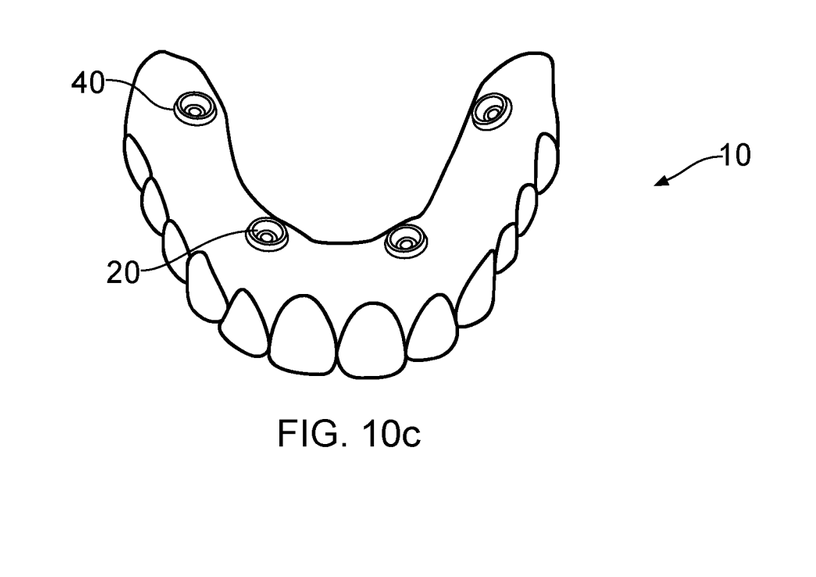

With reference to FIGS. 10a, 10b and 10c there is shown as series of dental prostheses 10 each comprising a plurality of locating formations 20 in accordance with the invention.

Prostheses 10 in accordance with the invention are preferably polymeric prostheses having a composition consisting of polyetheretherketone (PEEK) polymer, preferably, PEEK-OPTIMA™ of melt viscosity (MV) 0.45 kNsm$^{-2}$, simply referred to hereinafter as PEEK. Preferably still, the PEEK polymeric prostheses are formed from a JUVORA™ Dental Disc made from said PEEK-OPTIMA™.

FIGS. 4-7, 9 and 11a to 15 each show a cross-section of a segment of a PEEK dental prosthesis 10 in accordance with the invention at the region of a locating formation 20.

With reference to FIGS. 4, 11a, 12a, 13a, 14 and 15, locating formations 20 comprise a recess 30 adapted to receive a dental abutment, abutment multi-unit, or a dental implant fixture.

As shown in FIGS. 4, 6, 11a, 11b, 12a, 12b, 13a, 13b and 14, recess 30 comprises a first recess portion 13 formed in the PEEK material of the prosthesis 10, and a second recess portion 43 formed in a sleeve 40 locatable in the prosthesis.

In the examples of FIGS. 4-7 and 9, recess 30 is shown having an inverted conical frustum shape.

In the examples of FIGS. 11a to 13b, recess 30 is shown having a domed shape. In FIGS. 12a to 13b the recess has a spherical dome-shape.

Figure 14:
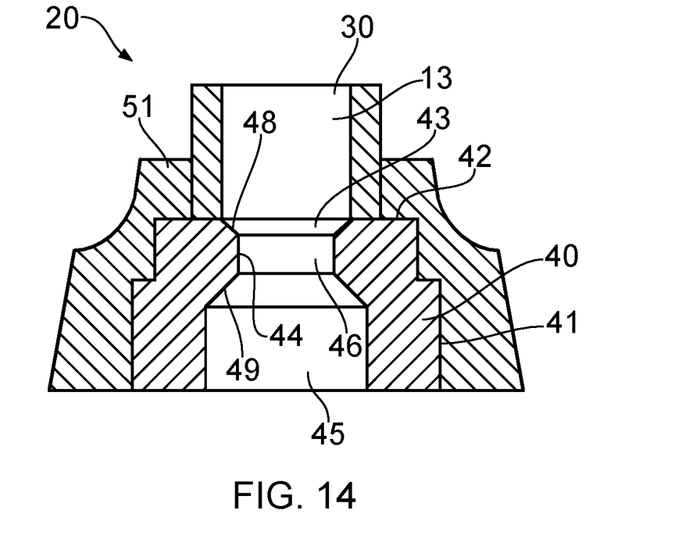
FIG. 14 is a cross-section of an exemplary locating formation in accordance with the invention adapted for connection directly to an implant head of a Straumann® dental implant system.

In the example of FIG. 14, recess 30 is shown having a substantially cylindrical first recess portion 13 and a tapered second recess portion 43 defined by a chamfer 48 around the circumference of an aperture provided though a hub 44 which separates said second recess 43 portion from the interior 45 of the sleeve as described below.

Figure 4:
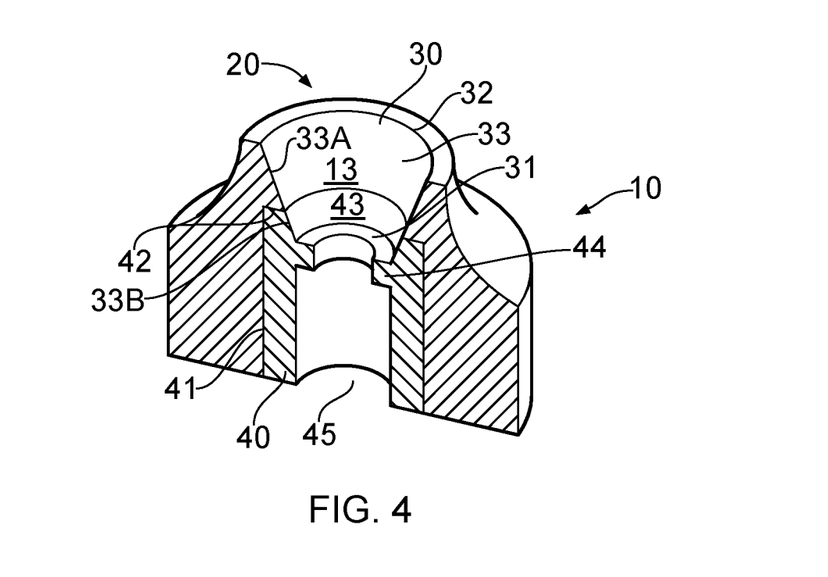
FIG. 4 is a perspective cross-section of a locating formation in accordance with the invention shown with a sleeve in position.

With reference to FIG. 4, when taken as a whole, each recess 30 comprises base 31 and a top 32, wherein the base is narrower than the top such that the sidewall 33 of said recess tapers towards the base 31.

Figures 5, 6:
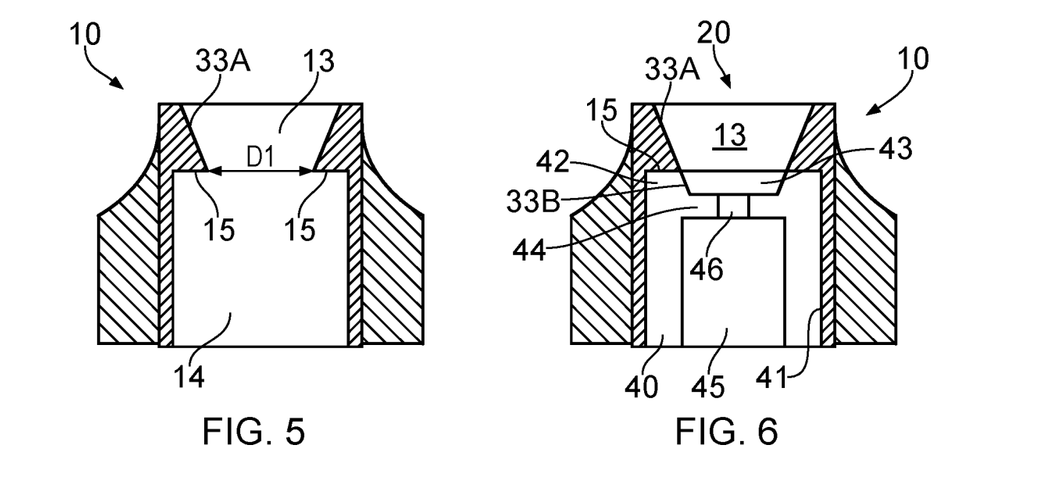
FIG. 5 is a cross-section elevation of the locating formation of FIG. 4 but shown with the sleeve absent.
FIG. 6 is a cross-section elevation of the locating formation of FIG. 4 shown with a sleeve.

In the example shown in FIG. 5, the first recess portion 13 is a tapered recess. The first recess 13 is formed in the PEEK material of the prosthesis, for example by computed aided milling or other suitable means. The first recess portion has an upper end and a lower end with a tapered sidewall 33A thereinbetween. The lower end of first recess portion 13 has a diameter D1. The tapered sidewall 33A has taper angle φ (not shown). A bore 14 having a diameter greater than D1 is formed in the prosthesis 10 below and opposing first recess portion 13 such that an annular undercut 15 region is formed immediately below said lower end of the first recess portion. Thus the bore 14 is in communication with the first recess portion 13.

In the examples shown in FIGS. 4-7 and 9, recess 30 is shown as an inverted conical frustum-shaped recess having a tapered sidewall 33, however it will be appreciated that the recess may be any other suitable inverted frustum-shaped recess and may therefore comprise a plurality of sidewalls.

Figures 7, 8, 9:
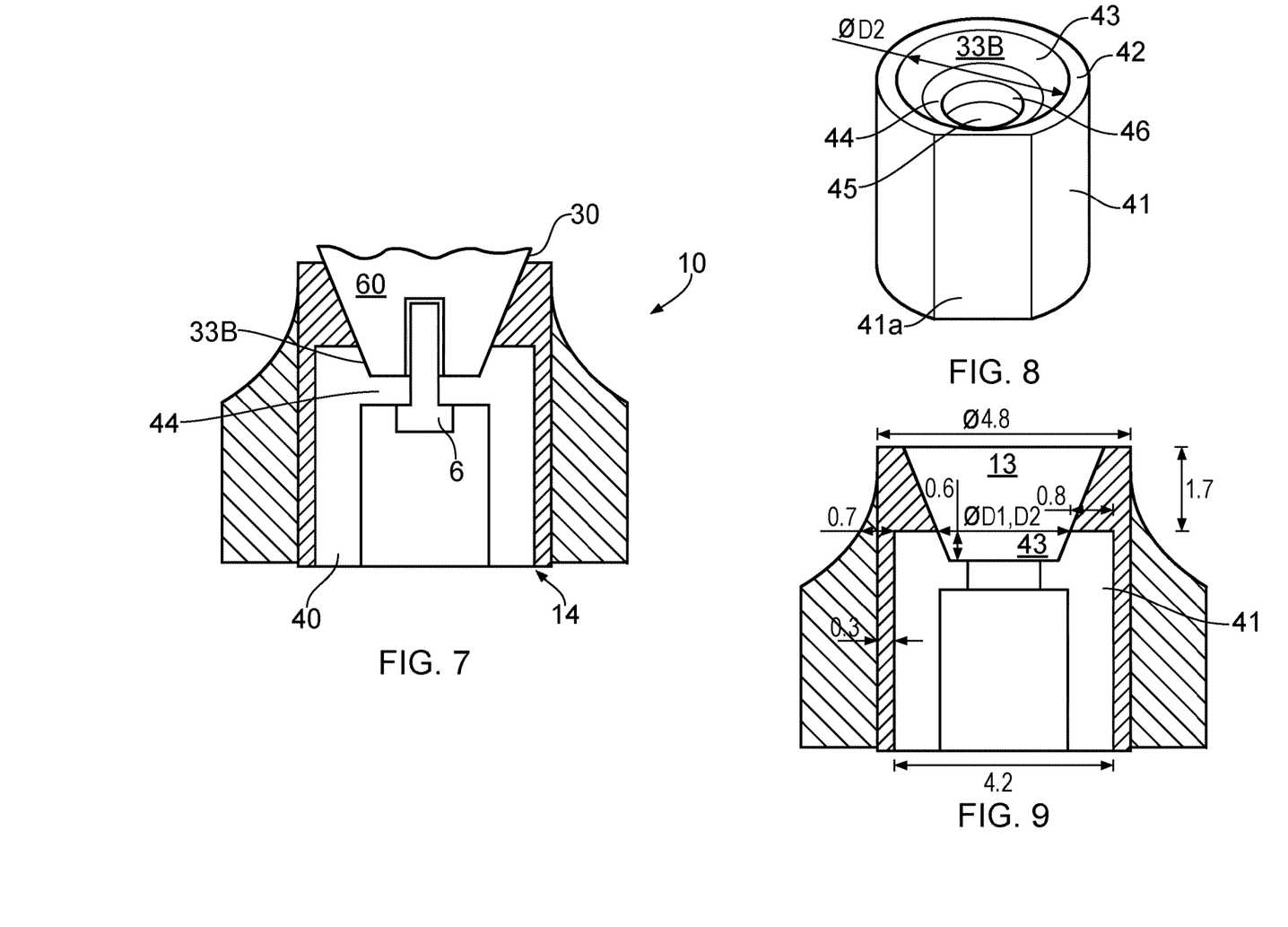
FIG. 7 is a cross-section elevation of the locating formation of FIG. 4 shown with a sleeve and exemplary dental abutment or implant feature in location.
FIG. 8 is a perspective view of an exemplary sleeve in accordance with the invention.
FIG. 9 is a dimensioned cross-section elevation of an exemplary locating formation in accordance with the invention.

With reference to FIGS. 4, 6 and 8, sleeve 40 comprises a generally tubular wall 41 and an annular shoulder portion 42 having an inner and an outer perimeter, wherein the inner perimeter of the shoulder portion 42 defines the perimeter of a recess portion 43. In FIGS. 4-8 recess portion 43 is shown having a tapered sidewall 33B surrounding an internally offset hub 44 which separates said recess portion 43 from the substantially cylindrical interior 45 of the sleeve. Recess portion 43 is thus the second recess portion of recess 30 in use.

The diameter D2 (FIG. 8) of the perimeter of recess portion 43 at its junction with the shoulder portion 42 is substantially the same as diameter D1 (FIG. 5) of the lower end of first recess portion 13 formed in the prosthesis.

The shoulder portion 42 and hub 44 of sleeve 40 lie on substantially parallel spaced apart planes which are substantially orthogonal to the wall 41.

The tapered sidewall 33B has a taper angle φ (not shown) which is substantially equal to the taper angle φ of tapered sidewall 33A. Thus the first recess portion 13 and the second recess portion 43 are contiguous.

Sleeve 40 is preferably manufactured from titanium or an alloy thereof, however other suitable materials or alloys may be used, for example, but not limited to Cobalt Chromium (Co—Cr), stainless steel, etc.

When sleeve 40 is fully inserted within bore 14 formed in the prosthesis as shown in FIG. 6, the tubular wall 41 of sleeve 40 is in slidable abutment with the surface of bore 14 and annular shoulder portion 42 of sleeve 40 abuts annular undercut region 15 immediately below the first recess portion 13.

As shown by way of example in FIG. 8, sleeve 40 is provided with a key formation 41a in order to prevent rotation of the sleeve relative the prosthesis. In FIG. 8 the illustrated key comprises a flat surface on the exterior of sidewall 41 of the sleeve which is adapted to engage with a complementary flat surface provided on bore 14 (not shown) however it will be appreciated that any suitable key arrangement may be employed, for example, but not limited to, ribs, ridges, notches and corresponding grooves, indentations, etc.

As described above with reference to FIGS. 5 and 8, the respective diameters D1 and D2 of first recess 13 and second recess 43 are substantially the same, and the taper angles φ of the respective tapered sidewalls 33A and 33B of recesses 13 and 43 are also substantially equal. Thus when sleeve 40 is located within bore 14 as described above and as shown in FIGS. 4 and 6, the first and second recess portions 13 and 43 are brought into mutual communication and their respective sidewalls 33A and 33B define a continuous tapered sidewall 33 of recess 30. Thus a dental abutment, abutment multi-unit or dental implant fixture 60 located within the locating formation as shown in FIG. 7 will be fully supported along its interface with recess 30. As a result of the presence of sleeve 40 at the interface between the PEEK prosthesis 10 and dental implant fixture 60, the locating formation of the present invention provides increased stability and strength to the connection between said prosthesis and dental implant fixture.

As shown in FIG. 7, when a dental abutment or an abutment multi-unit 60 is located within recess 30, the surface of hub 44 proximate sidewall 33B of recess portion 43 of sleeve 40 abuts the terminal end of said dental abutment or abutment multi-unit.

As shown in FIG. 7, an aperture 46 (see FIGS. 6 and 8) provided though hub 44 permits the shank of a screw 6, inserted via the interior 45 of the sleeve to extend through said sleeve 40 and into recess 30 of locating formation 20 to screw threadedly engage with the dental abutment 60. As screw 6 is tightened, the screw head engages the reverse side of hub 44 thereby drawing the prosthesis 10 into tighter abutment with the dental abutment 60 thereby affixing the prosthesis firmly to the patient's jaw.

Referring to FIG. 9, exemplary dimensions of a locating formation having an inverted conical frustum shape and comprising a titanium sleeve in accordance with the invention are shown. It will be appreciated that these exemplary dimensions apply also to titanium sleeves formed having a dome-shaped recess therein. In the example shown, the depth of the first recess portion 13 (i.e. formed in the polymer of the prosthesis) is approximately 1.7 mm; the depth of the second recess portion (i.e. formed in the sleeve) is approximately 0.6 mm (thus the depth of recess 30 is approximately 2.3 mm); the diameter D2 of the second recess portion 43 at its junction with the annular shoulder portion 42 is approximately 2.6 mm (thus the diameter D1 of the lower end of first recess portion 13 is also approximately 2.6 mm); the width of annular shoulder portion 42 is approximately 0.8 mm; the diameter of the sleeve is 4.2 mm.

Ideally the minimum thickness of the PEEK prosthesis surrounding the sleeve 40 at it its closest point to the sleeve wall (i.e. perpendicularly adjacent the outer perimeter of annular shoulder 42) is 0.5 mm.

Preferably, the thickness of the PEEK prosthesis surrounding the sleeve at it its closest point to the outer diameter of the sleeve wall sleeve 40 at it its closest point to the sleeve wall (i.e. perpendicularly adjacent the outer perimeter of annular shoulder 42) is at least 0.7 mm.

With reference to FIGS. 11a-13b a recess 20 having a dome-shape is shown. Other than the specific shape of the recess defined by its first 13 and second 43 portions, the structure, function and form of a dome-shaped recess and associated reinforcing sleeve 40 is substantially the same as that described in respect of the examples above.

Figure 11A:
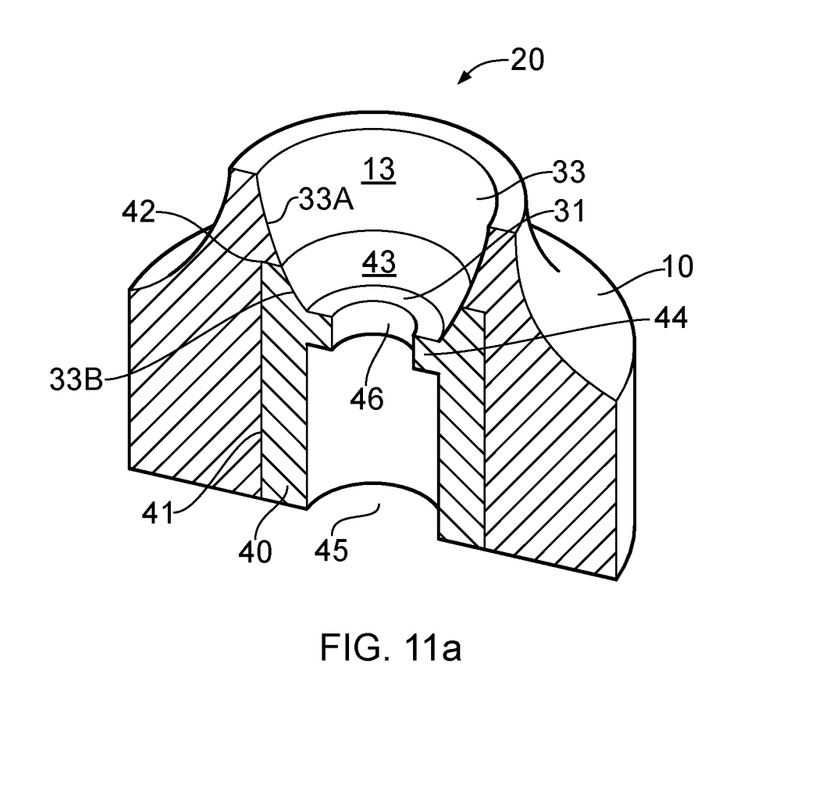
FIGS. 11a, 12a and 13a are perspective cross-sections of exemplary locating formations in accordance with the invention having domed shapes.
Figure 11B:
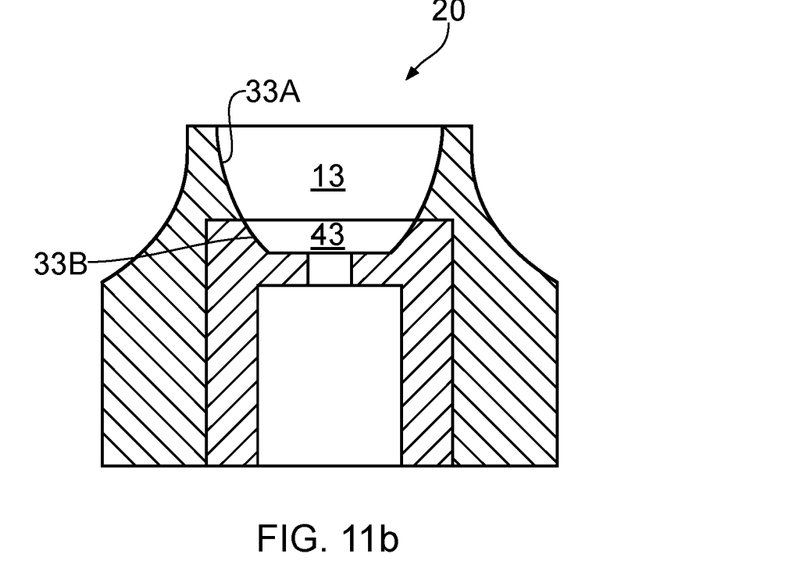
FIGS. 11b, 12b and 13b are cross-section elevations of the locating formations of FIGS. 11a, 12a and 13a, respectively.

In the example shown in FIGS. 11a and 11b, the first recess portion 13 (formed in the PEEK material of the prosthesis) and the second recess portion 43 (formed in sleeve 40 locatable in the prosthesis) have curved sidewalls 33 A and 33B which are contiguous such that they define a continuous curved sidewall 33 of recess 30. In the example recess 30 has a substantially flat base 31.

Figure 12A:
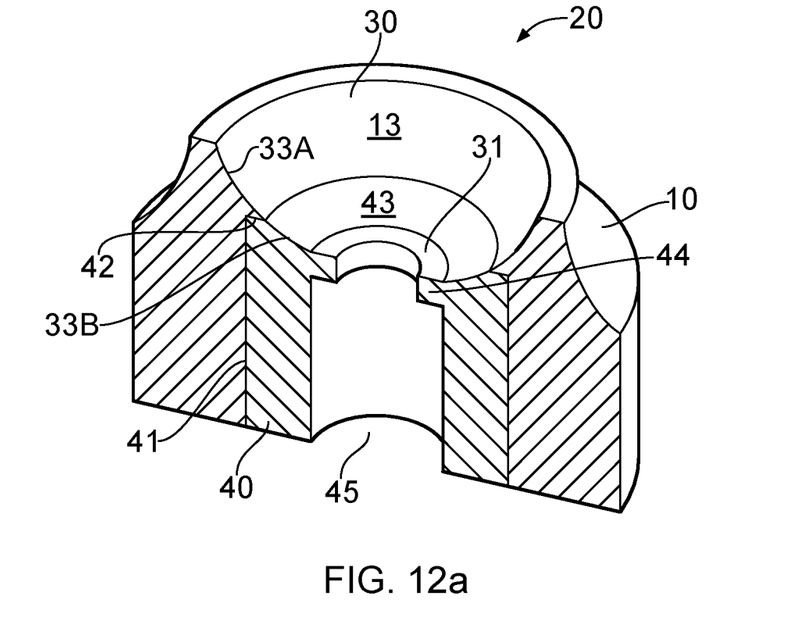
Figure 12B:
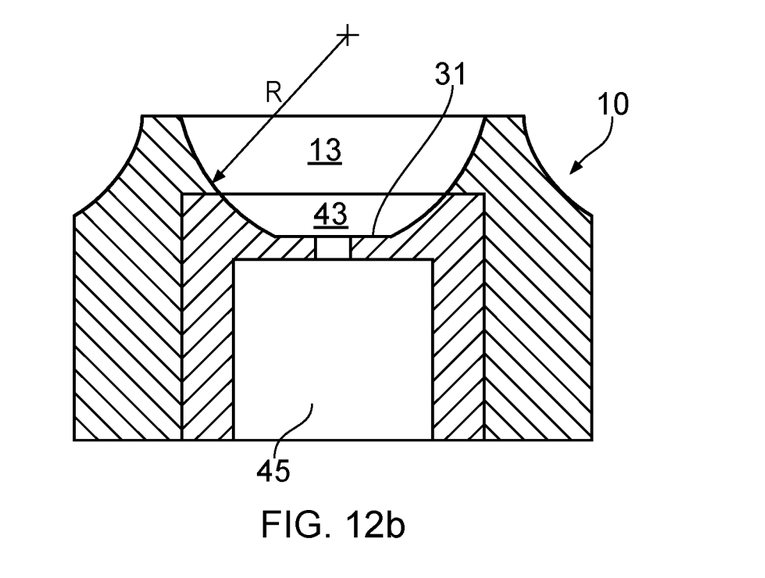

In the example shown in FIGS. 12a and 12b, the recess 20 is a spherical dome shape wherein the first recess portion 13 (formed in the PEEK material of the prosthesis) and the second recess portion 43 (formed in reinforcing sleeve 40) each have the shape of a spherical segment Thus recess 20 has contiguous curved sidewalls 33 A and 33B and a substantially flat base 31. The first 13 and second 43 recess portions have the same spherical radius R such that they are contiguous.

Figure 13A:
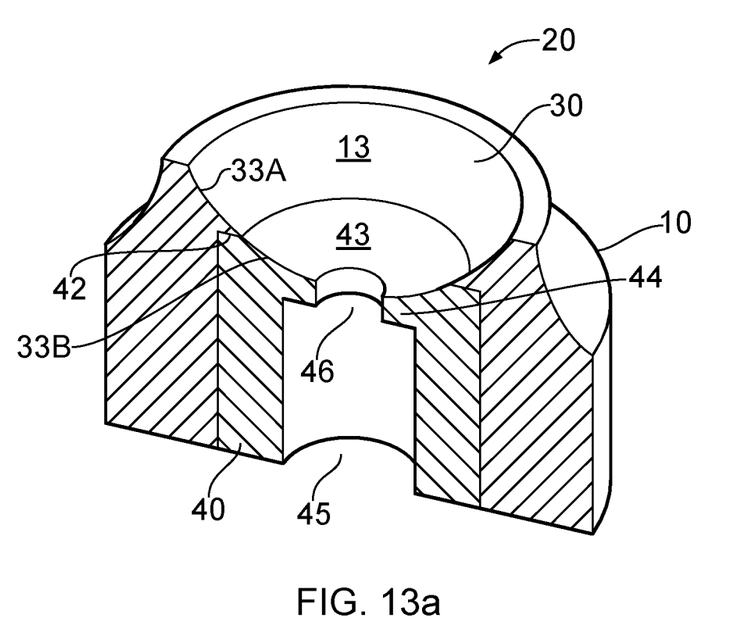
Figure 13B:
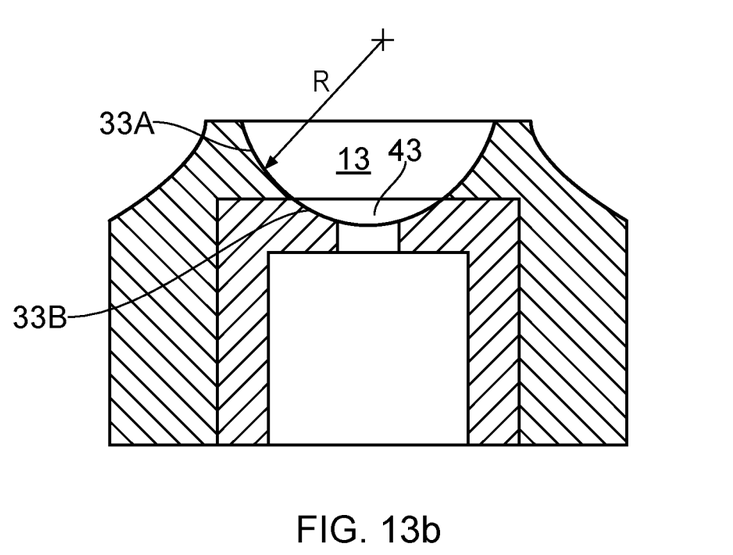

In the example shown in FIGS. 13a and 13b, first recess portion 13 (formed in the PEEK material of the prosthesis) has the shape of a spherical segment while the second recess portion 13 (i.e. formed in the reinforcing sleeve) has the shape of a spherical cap. The first 13 and second 43 recess portions have the same spherical radius R such that they are contiguous, however recess 30 is absent a flat base.

In the example shown in FIG. 14, which is adapted for direct connection to an implant head of a Straumann® dental implant system, the first recess portion 13 (formed in the PEEK material of the prosthesis) is substantially cylindrical. The second recess portion 43 is formed in sleeve 40 and is defined by a chamfer 48 provided on shoulder portion 42 and around the circumference of aperture 46 provided though hub 44 which separates said second recess portion 43 from the interior 45 of the sleeve. A second chamfer 49 is provided around the hub 44 adjacent the cylindrical interior 45 of the sleeve. An annular trough 51 formed around the cylindrical wall of the first recess portion 13 at a lower end of said first recess portion is adapted to engage flush with a corresponding feature of a Straumann® dental implant design, and on an external emergence profile to fit with the gum line in use.

In the example of FIG. 14, recess 30 is shown having a substantially cylindrical first recess portion 13 and a tapered second recess portion 43 defined by a chamfer 48 around the circumference of an aperture provided though a hub 44 which separates said second recess 43 portion from the interior 45 of the sleeve as described below.

Figure 15A:
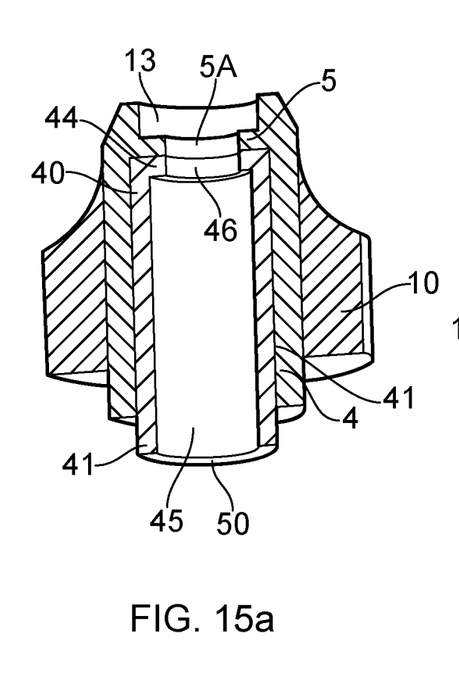
FIGS. 15a and 15b are cross-sections of an exemplary locating formation in accordance with the invention adapted for connection directly to an implant head of a Nobel Biocare) dental implant.
Figure 15B:
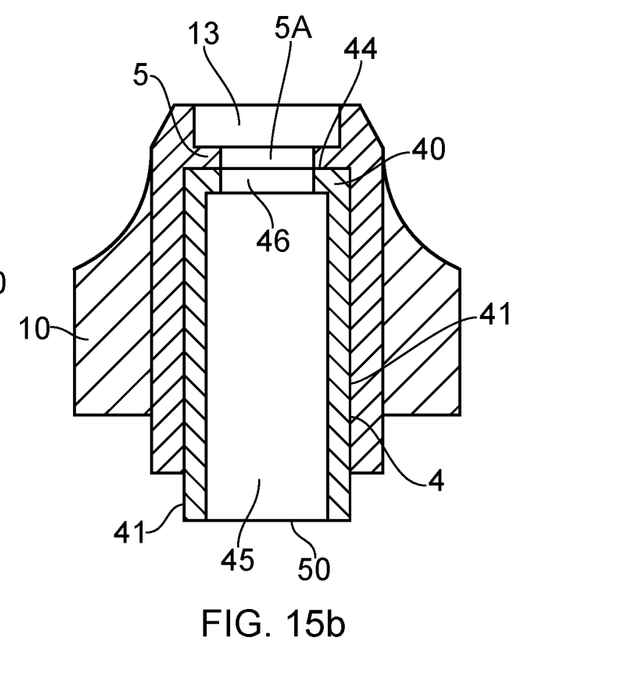

With reference to FIGS. 15a and 15b, in an aspect of the invention there is provided a reinforcing sleeve for location in a bore 4 formed in dental prosthesis, the reinforcing sleeve 40 comprising a generally tubular wall 41 and having a hub 44 at one end and an open bore 50 at an opposing end. The hub 44 is provided with an aperture 46. Aperture 46 has a diameter that is less than the diameter of the opposing open bore 50. The reinforcing sleeve 40 is insertable into the bore 4 formed in the prosthesis 10 such that the hub 44 abuts the underside of a flange 5 formed in said prosthesis, the flange being located intermediate the bore 4 and a recess 13. When located in the prosthesis in this way, aperture 46 aligns with an aperture 5A defined by flange 5A such that the shank of a screw (not shown) inserted into the prosthesis via the interior 45 of the reinforcing sleeve 40 can extend through said sleeve 40 and into the recess 13 formed in the prosthesis 10 in order to screw threadedly engage the head of a dental implant (not shown) located in recess 13. As the screw (not shown) is tightened, the screw head will engage the underside of the hub 44 thereby drawing the prosthesis 10 into tighter engagement with the dental implant head. Such a reinforcing sleeve is particularly suited for use with Nobel Biocare) dental implant systems.

Reinforcement of the connection between a dental implant fixture and a prosthesis 10 by the use of a locating formation 20 comprising a reinforcing sleeve 40 in accordance with the invention enables a wider range of torque forces can be applied to the screw used to secure the prosthesis 10 to the implant feature 60.

This is because the sleeve 40 provides an interface between the screw and the polymeric prosthesis 10 such that the screw does not directly impinge or contact the polymeric prosthesis, but rather the screw head engages the reverse side of the hub 44 of the sleeve.

Thus higher torque forces can be applied than otherwise would be possible without the presence of such a sleeve 40. Accordingly, the sleeve provides increased stability and wider user flexibility when torqueing the prosthesis 10 to a dental implant feature 60.

The sleeve 40 allows for a more precise fit between the polymeric prosthesis and the implant interface improving the passivity of the system. Accordingly, the sleeve 40 allows for a greater degree of passivity seating when torqueing the prosthesis 10 to a dental implant feature 60.

Sleeves 40 also permit the use of screws having small or conical heads to secure a prosthesis 10 to an implant feature 60. Thus the invention permits the use of a wider range of dental implant systems, in particular dental implant features adapted to use abutment screws carrying conical and small screw heads.

Advantageously, the small size of the sleeve (approximately 4.2 mm diameter) mitigates its impact on the overall dimensions of a polymeric prosthesis adapted to receive such a sleeve. Thus prostheses in accordance with the invention achieve maximum stability with minimal dimensional change required to said prostheses.

The invention claimed is:

1. A dental prosthesis formed of a composition comprising a polymeric material, the prosthesis comprising one or more locating formations adapted to receive a dental implant fixture or dental abutment, the or each locating formation comprising a recess having an inverted frustum-shape, the recess comprising a first recess portion formed in the polymeric material of the prosthesis, and a second recess portion provided in a sleeve located below the first recess within the prosthesis, wherein a lower edge of the first recess portion abuts an upper edge of the second recess portion, said lower edge and upper edge having a substantially equal diameter;

wherein the polymeric material of the prosthesis comprises a repeat unit of formula (I):

wherein t1 and w1 independently represent 0 or 1 and v1 represents 0, 1 or 2;

and wherein the sleeve is manufactured from titanium or an alloy thereof.

2. A dental prosthesis as claimed in claim 1, wherein the recess comprises a base located in the second recess and a top located in the first recess, wherein the base is narrower than the top such that a sidewall of said recess tapers towards the base.

3. A dental prosthesis as claimed in claim 1, wherein the recess has an inverted conical frustum shape.

4. A dental prosthesis as claimed in claim 1, wherein the first recess portion and the second recess portion are contiguous.

5. A dental prosthesis as claimed in claim 4, wherein the sleeve is slidably locatable into a bore formed in the prosthesis below and opposing the first recess portion such that a generally tubular wall of said sleeve is in abutment with the surface of said bore and an annular shoulder portion of said sleeve abuts an annular undercut region immediately below the lower end of the first recess portion.

6. A dental prosthesis as claimed in claim 4, wherein the sleeve comprises means to prevent rotation of the sleeve relative to the prosthesis, wherein the means to prevent rotation of the sleeve relative the prosthesis comprises a key formation on an outer surface of a sleeve wall which is adapted to engage with a complementary key formation provided on or in a bore formed in the prosthesis below and opposing the first recess portion, and wherein the respective key formations comprise one or more complementary flat portions provided on the respective opposing surfaces of the sleeve and of said bore.

7. A dental prosthesis as claimed in claim 1, wherein the first recess portion is formed in the polymeric material of the prosthesis by milling.

8. A dental prosthesis as claimed in claim 1, wherein the first recess portion has an upper end and a lower end with a sidewall extending therebetween.

9. A dental prosthesis as claimed in claim 8, wherein the sidewall of the first recess portion is a tapered sidewall having a taper angle Φ, or wherein the sidewall of the first recess portion is a curved sidewall having a radius of curvature R, and/or wherein the dental prosthesis further comprises a bore formed below and opposing the first recess portion, the bore having a having a diameter greater than the diameter of the lower end of the first recess portion such that an annular undercut region is formed immediately below the lower end of the first recess portion.

10. A dental prosthesis as claimed in claim 1, wherein the sleeve comprises a hub that is internally offset from an annular shoulder portion and defines an aperture that separates said recess from a lower interior section of the sleeve, the hub and the annular shoulder portion lie on substantially parallel spaced apart planes which are substantially orthogonal to a generally tubular wall of said sleeve.

11. A dental prosthesis as claimed in claim 1, wherein the depth of the first recess portion is approximately 1.7 mm.

12. A dental prosthesis as claimed in claim 1, wherein the depth of the second recess portion is approximately 0.6 mm.

13. A dental prosthesis as claimed in claim 1, wherein the diameters of the perimeter of the second recess portion and the lower end of the first recess portion are approximately 2.6 mm.

14. A dental prosthesis as claimed in claim 1, wherein the width of an annular shoulder portion of the sleeve is approximately 0.8 mm and wherein a minimum thickness of the prosthesis surrounding the sleeve adjacent to an outer perimeter of the annular shoulder portion of the sleeve is approximately 0.5 mm or wherein the thickness of the prosthesis surrounding the sleeve adjacent to the outer perimeter of the annular shoulder portion of the sleeve is at least 0.7 mm.

15. A dental prosthesis as claimed in claim 1, wherein the second recess portion comprises an annular sidewall surrounding a hub, wherein the annular sidewall of the second recess portion is a tapered sidewall having a taper angle Φ that is substantially the same as a taper angle Φ of a sidewall of the first recessed portion.

16. A dental prosthesis as claimed in claim 15, wherein the annular sidewall of the second recess portion is a curved sidewall having a radius of curvature R that is substantially the same as a radius of curvature R of the sidewall of the first recessed portion.

17. A dental prosthesis as claimed in claim 15, wherein the second recess portion is defined by a chamfer provided on an annular shoulder portion and around a circumference of an aperture provided through the hub.

18. A dental prosthesis as claimed in claim 1, wherein the sleeve comprises a generally tubular wall and an annular shoulder portion, wherein the inner perimeter of the annular shoulder portion defines the perimeter of the second recess portion.

* * * * *